May 26, 1970  R. W. MacDONNELL  3,514,169
SELF-LUBRICATING SIDE BEARING
Filed Sept. 16, 1968  5 Sheets-Sheet 1
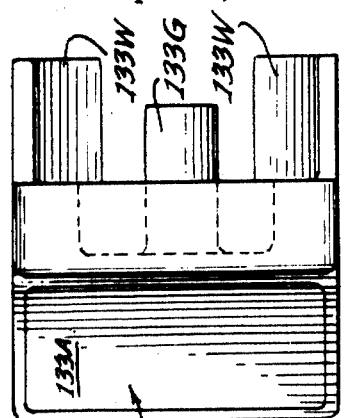
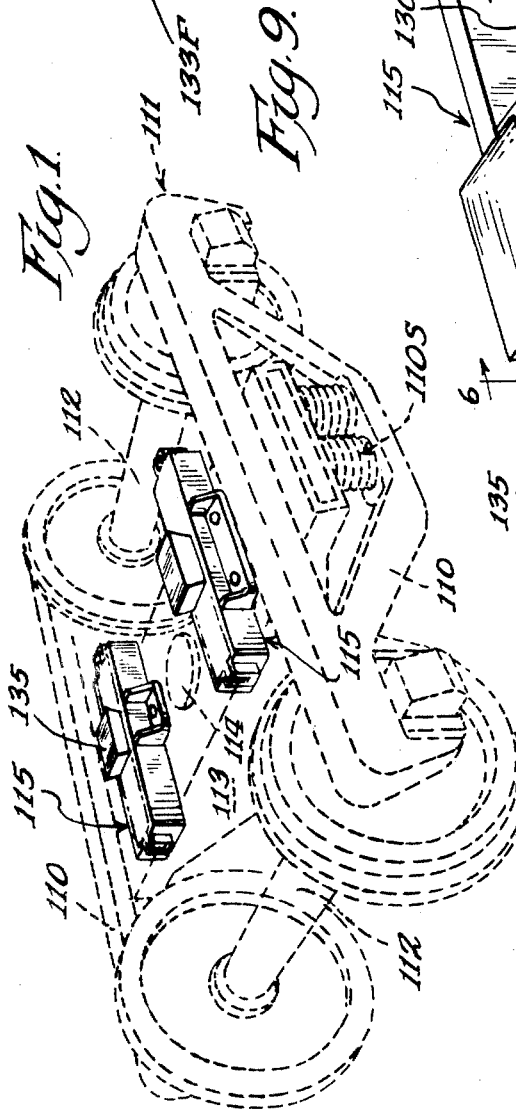
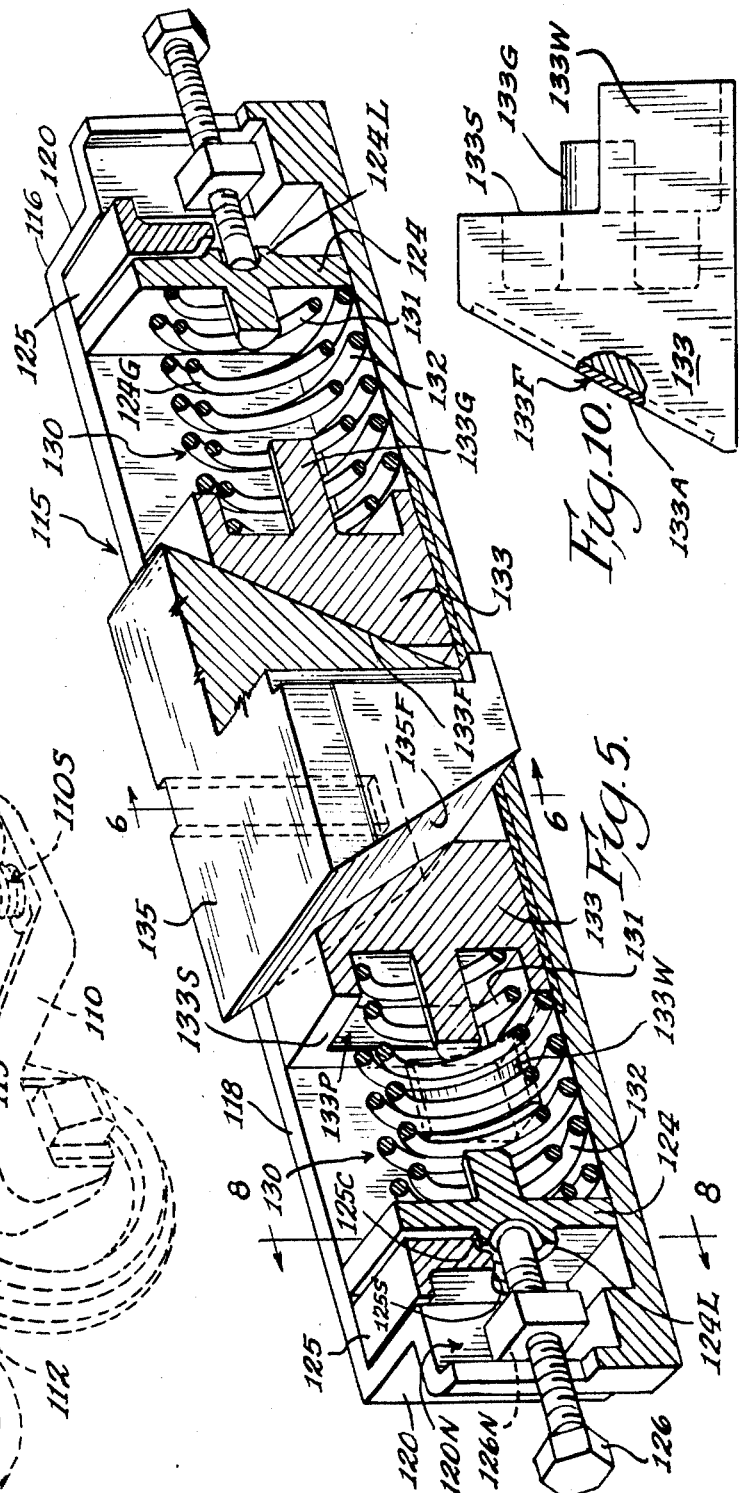
Inventor
Robert W. MacDonnell
By
J. Patrick Cagney
Attys.

Inventor
Robert W. MacDonnell
By
J. Patrick Cagney
Atty

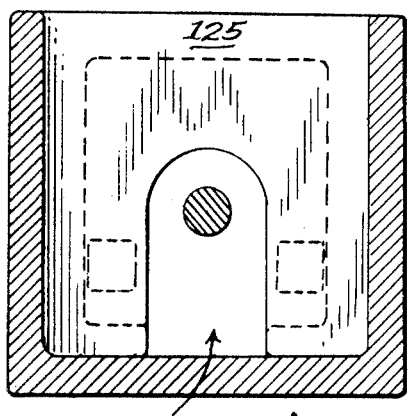
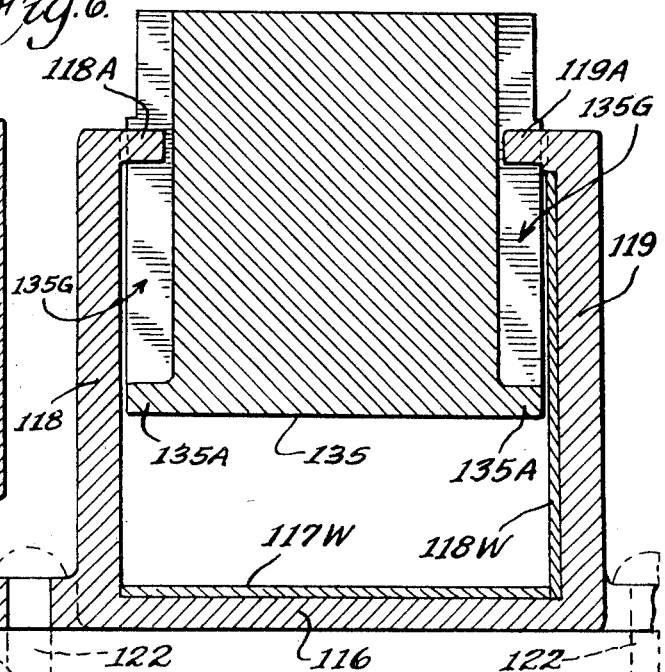
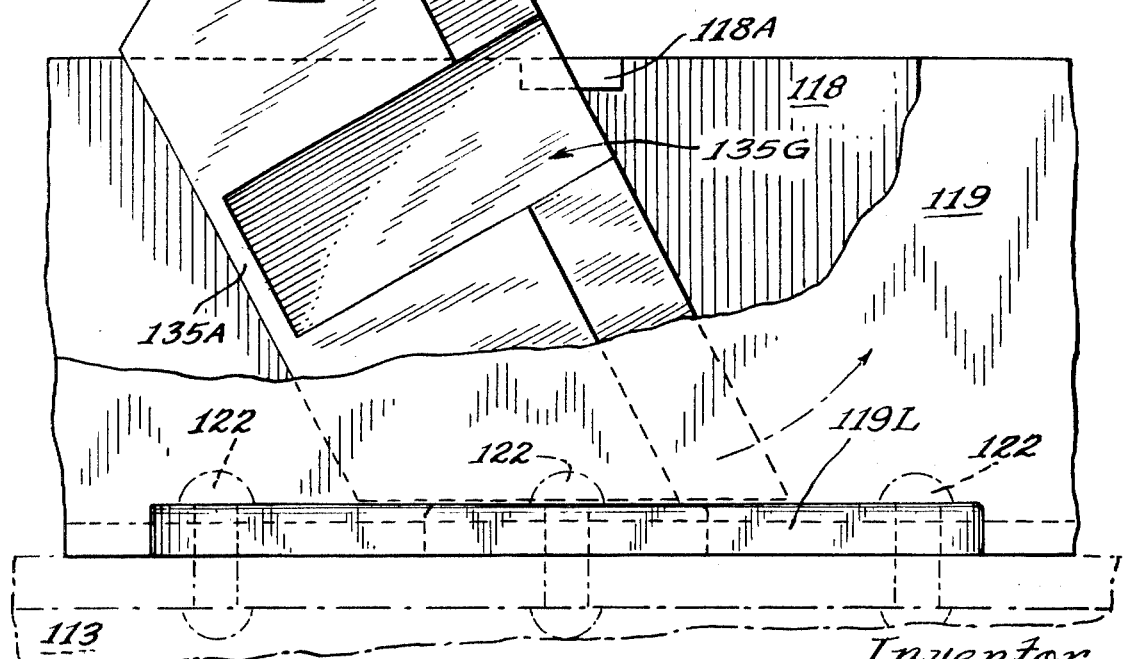

May 26, 1970     R. W. MacDONNELL     3,514,169

SELF-LUBRICATING SIDE BEARING

Filed Sept. 16, 1968     5 Sheets-Sheet 4

INVENTOR
Robert W. MacDonnell
BY J. Patrick Cagney
ATTORNEY

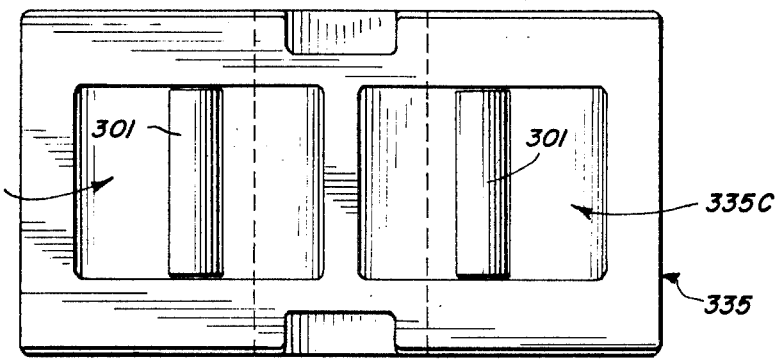
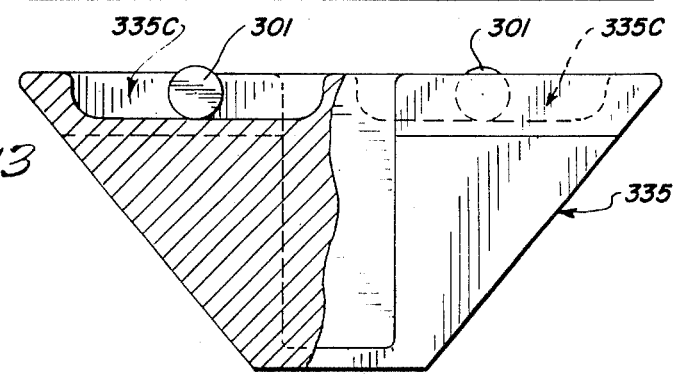
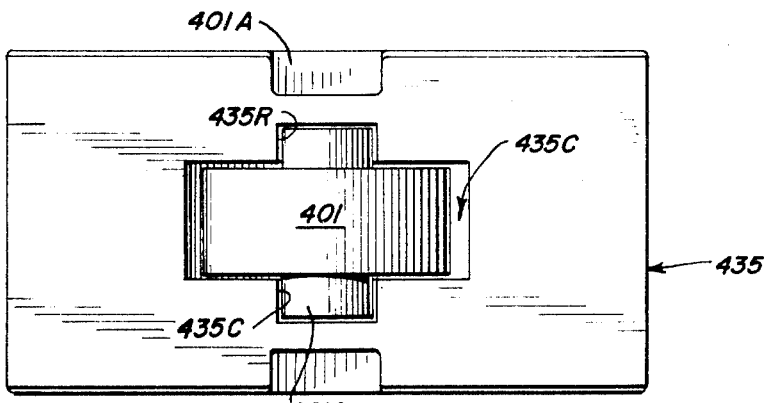
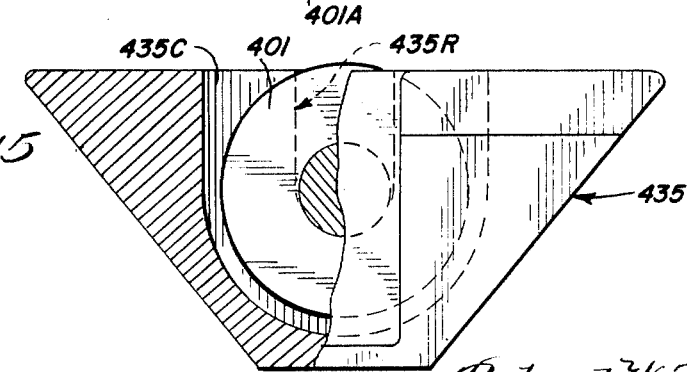

United States Patent Office 3,514,169
Patented May 26, 1970

3,514,169
SELF-LUBRICATING SIDE BEARING
Robert W. MacDonnell, Crete, Ill., assignor to Unity Railway Supply Co., Inc., Chicago, Ill., a corporation of Illinois
Continuation-in-part of application Ser. No. 676,259, Oct. 18, 1967. This application Sept. 16, 1968, Ser. No. 760,019
Int. Cl. F16c *17/00, 19/00*
U.S. Cl. 308—138
10 Claims

ABSTRACT OF THE DISCLOSURE

Pre-loaded side bearing units are disclosed acting between a railway truck bolster and a car body bolster to control body sway by frictional energy dissipation and to prevent wheel lifts by maintaining pressure on the unloaded truck side. The disclosed side bearing units replace existing conventional side bearings or may be integrated with a modified bolster. Each side bearing unit comprises a housing that carries a pair of wedge blocks in sliding engagement therein, with a floating upper wedge block having oppositely inclined faces engageable with correspondingly inclined faces presented by the sliding blocks. Compression spring means react against opposite end walls of the housing to urge the sliding blocks oppositely and establish the level of preloading. Urethane springs of high force constant are floatingly disposed in the compression springs to pick up load during the final portion of closure travel to increase the frictional energy dissipation characteristics of the units. Rollers are provided in the top of the wedge block to facilitate swivel movement of the car body bolster on curves.

RELATED APPLICATION

This application is filed as a continuation-in-part of pending MacDonnell application Ser. No. 676,259 filed Oct. 18, 1967 and granted as U.S. Pat. No. 3,401,991 issued Sept. 17, 1968.

BACKGROUND OF THE INVENTION

This invention relates to side bearing units interposed between a railway truck bolster and a car body to control body roll. With present day side bearings, there remains a problem that is most acute in the case of high capacity car operations. In the case of high, long or heavy cars or cars with high centers of gravity, the truck wheels actually can lift off the rails upon excessive swaying or bouncing of the car. Wheel lifts occur as a result of car body roll causing a transfer of the car body load from the center plate to the side bearing. This transfer of load to the side bearings brings excessive loading on the truck springs and upon a build up of the swaying action, the truck springs finally go solid on one side so that the other side becomes completely unloaded with the result that the wheels at the unloaded truck side actually can lift.

SUMMARY OF THE INVENTION

The present invention provides pre-loaded side bearings which serve both to control car body sway by taking up sway energy through friction dissipation and to maintain pressure between the car body and the bolster at the unloaded side thereby preventing wheel lift.

In accordance with the present invention, a pre-loaded side bearing unit comprises a box-like support having a bottom wall and a pair of upstanding end walls, means to secure the support to a railway truck bolster, a pair of wedge blocks slidably mounted on the bottom wall, the wedge blocks having downwardly converging inclined transversely extending surfaces, a central plunger wedge mounted on the wedge blocks and having downwardly converging inclined friction surfaces slidably engaged on and mating with the inclined wedge block surfaces, and compression spring means resiliently biasing the wedge blocks oppositely inwardly to establish a normal position for the wedge blocks and the upper block wherein a central clearance space extends full length between the wedge blocks and wherein the force of the compression spring means reacts oppositely on the end walls, the central plunger having a top wall adapted to supportingly engage the bottom surface portion of a railway car body located above the bolster for stabilizing the car supported on the bolster and for minimizing side sway of the car under operating conditions.

The pre-loaded side bearing units, by maintaining constant downward pressure hold the truck down, reduce nosing of the truck to provide greater wheel flange life and relieve stress on the car body bolster, reducing car wear.

Each compression spring assembly is of a double coil type. An outer coil acts throughout the travel of the plunger wedge and determines pre-load forces acting at the pre-load assembled position. An inner coil acts only when the plunger wedge is near or below its pre-load installed position. A urethane spring is floatingly disposed in each inner coil to act only during the final inch of closure travel of the plunger and provide greatly increased spring force and energy dissipation characteristics. The plunger wedge has cavities in its top face to mount anti-friction roller means for facilitating swivel movement of the car body bolster when the car is negotiating curves in the track.

The urethane spring inserts cooperate with the rollers in the continuously loaded type of side bearing disclosed herein in that the increased energy dissipation minimizes the active load transmitted through the rollers and thereby minimizes the pressure concentration effect at the rollers.

Other features and advantages of the invention will be apparent from the following description and claims, and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same, FIG. 1 is a perspective view showing a conventional railway car truck in phantom and illustrating another side bearing embodiment in mounted position thereon;

FIG. 5 is a perspective view of the side bearing uni* when in its pre-loaded installed position, with the view showing the parts in lengthwise section to facilitate disclosure;

Figure 12:
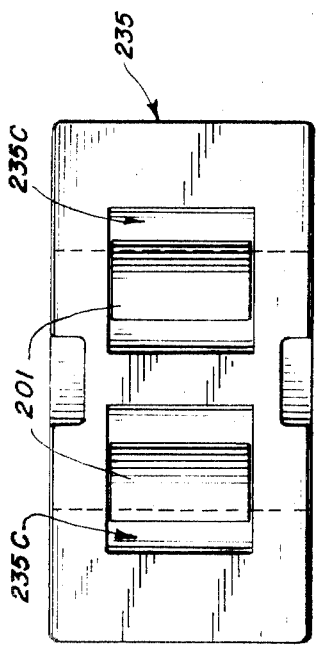
Figure 11:
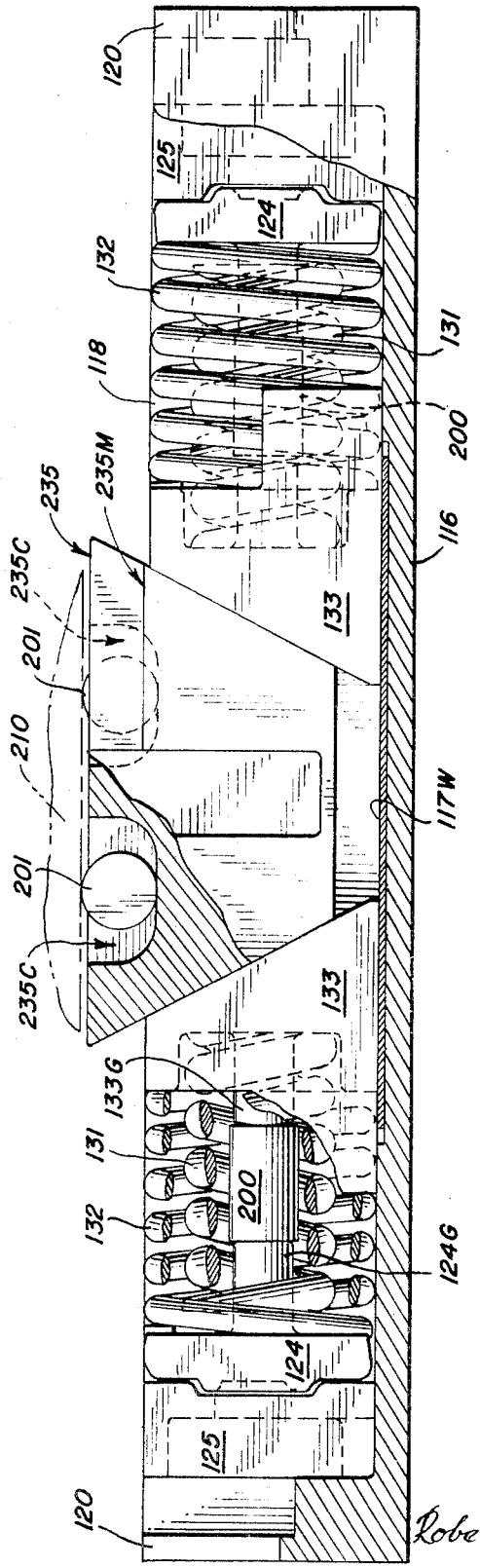

FIG. 6 is a transverse section through the side bearing unit and is taken on the line 6—6 of FIG. 5;

FIG. 7 is a fragmentary elevational view, with parts broken away, illustrating assembly of the unit;

FIG. 8 is a transverse section through the unit and is taken on the line 8—8 of FIG. 5;

FIG. 9 is a top plan view of a wedge block;

FIG. 10 is a side elevation view of the wedge block of FIG. 9;

FIG. 11 is a transverse sectional view of a modified embodiment of a side bearing;

FIG. 12 is a plan view of the plunger in the modified embodiment of FIG. 11;

FIG. 13 is a transverse view of an alternative plunger arrangement;

FIG. 14 is a plan view of the plunger shown in FIG. 13;

FIG. 15 is a transverse view of still another plunger arrangement; and

FIG. 16 is a plan view of the plunger shown in FIG. 15.

DESCRIPTION OF PREFERRED EMBODIMENTS

Referring to the drawings, and more particularly to the embodiment shown in FIGS. 1 to 10, a conventional railway truck, as designated generally at 111, includes a pair of side frames 110 that ride on the journal ends of the wheel and axle units 112. Each side frame 110 (FIG. 1) is equipped with a spring group 110S to support opposite ends of a conventional truck bolster 113 which is shown equipped with the usual center plate 114 for receiving the car body bolster B (FIG. 2) in swivelled relation. Side bearing units 115 are shown seated on the bolster 113 and are positioned symmetrically on opposite sides of the center plate to seat on the truck bolster 113 and engage the underface of the car body bolster B.

The side bearing units 115 produce internal frictional sliding movement in resisting side sway of the car body relative to the truck bolster so that the sway energy is continuously dissipated. The stabilizers, as installed, are pre-loaded to the extent shown in FIG. 5 so that, during normal running conditions, the units provide points of contact with the car at both sides instead of just at the center plate 114.

In the embodiment shown in FIGS. 1 to 10, each side bearing unit 115 is illustrated as a separate component to be installed in place of and at the same location as a standard side bearing. The invention also contemplates that the side bearing could be incorporated bodily within the bolster by use of a modified bolster design that provides operating pockets for the movable or live parts of the side bearing units, without requiring any change in the live parts.

The illustrated arrangement comprises a box-like support housing 116 having a bottom wall 117, longitudinal outer and inner side walls 118, 119 and end walls 120, 120, the housing 116 being open at the top. Again, the housing 116, being illustrated as a separate unit, is shown secured to the bolster 113 by a number of fasteners 122 which engage external mounting lugs 118L, 119L.

The live parts shown herein include a pair of wedge blocks or shoes 133 mounted to slide along the bottom wall 117 of the housing, the wedge blocks 133 presenting oppositely transversely extending friction surfaces 133F engageable with corresponding friction surfaces 135F along oppositely inclined underface regions of a floating upper wedge block or plunger 135. In this embodiment, the friction surfaces 133F converge downwardly and the complementary floating block tapers downwardly to provide correspondingly downwardly tapering surfaces 135F for broad faced frictional sliding engagement with the friction block surfaces. The wedge blocks 133 are resiliently biased in opposite directions by compression spring assemblies 130 which act to urge the wedge blocks 133 together. The compression spring assemblies 130 act oppositely on the end walls 120, each assembly being shown reacting through an adjustable spring seat 124 backed by a filler block 125 to transmit the spring load to the corresponding end wall 120.

Each of the wedge blocks 133 has a recessed rear face to provide a spring pocket 133P bounded by a spring seat surface, 133S. Integral side and bottom wing portions 133W extend rearwardly from regions flanking the lower half of the spring seat surface 133S and a central guide stem portion 133G projects through the pocket 133P to terminate medially along the winged section. Each of the spring seats 124 has a corresponding guide stem portion 124G projecting towards the guide stem 133G of the corresponding wedge block and has an oppositely projecting rectangular central lug portion 124L provided with a central socket.

Adjustment bolts 126 and captive nuts 126N are removably seated in notched regions 120N provided in each end wall 120, with the bolts 126 projecting into the sockets defined by the lugs 124L to facilitate initial assembly and adjustment of the units. The bolts 126 function simultaneously in holding the spring seats 124 spaced from the end walls 120 a distance sufficient to enable insertion of the filler blocks 125. Thereafter, the bolts 126 are backed off so that the spring forces react through each spring seat 124 and corresponding filler block 125. Each of the filler blocks 125 has a vertical slot 125S to permit the block to be inserted in straddling relation to the shank of the bolt 126 and each block has a complementary central socket 125C bordering the slot 125S and shaped to receive and interlock with the lug portion 124L. The bolts 126 and nuts 126N are removed after the filler blocks 125 are in place.

Each of the spring assemblies 130 includes an inner coil spring 131 and an outer coil spring 132. In the disclosed arrangement, the inner coil spring 131 nests within the spring pocket 133P and is telescoped over and guided by the stem portions 133G and 124G while the outer coil spring 132 seats against the intermediate spring seat surface 133S and is guided by the winged sections 133W.

The upper wedge block 135 acts as a floating plunger working against spring backed slidable blocks 133. While the spring forces normally act to lift the upper wedge block, it is retained against escape by a mechanical interlock relationship with the housing 116. Thus, the side walls 118, 119 have confronting abutment lugs 118A, 119A centrally along the top edges thereof and the floating block 135 has vertical guideways 135G along opposite side faces thereof and receiving the lugs 118A, 119A. The guideways 135G terminate short of the base of the upper block so that central abutment ledges 135A are provided which are engageable with the abutment lugs 118A, 119A to limit the maximum vertical travel of the plunger block 135. The floating block 135, as shown herein, is 4⅝ inches wide, has a 5 inch long bottom face and a 9¼ inch long top face and is 4 inches high so that its side faces 135F are inclined at an angle of 62° from the horizontal.

In the assembly of the side bearing units, the plunger block 135 is first inserted into the housing 116 adjacent one end thereof and in a canted relationship wherein the friction face 135F seats flush against the bottom wall 117. The plunger block 135 is then slid along the bottom wall towards the canted center position at which it is illustrated in FIG. 7. In this canted center position, the lugs 118A, 119A project partway into the upper ends of the obliquely oriented guideways 135G so that the plunger block can be rotated to a symmetrical position wherein the abutment lugs 118A, 119A extend crosswise in the upper regions of the guideways.

Adequate end clearance now exists in the housing 116 on both sides of the block 135 to permit insertion of the slidable wedge blocks 133, the spring seats 124 and the coil springs 131, 132. The winged sections 133W of the slide blocks serve as a cradle for the end of the outer coil 132, with the interengagement of the cradle and the coil end acting to hold the slide block against tipping during assembly. The bolts 126 are actuated to advance the spring seats 124 from the housing end walls so that the filler blocks 125 can be dropped into place, with the bolts then being backed off to permit the spring reaction to be taken by the filler blocks. The advance of the spring seats 124 develops a spring thrust against the slide blocks to lift the floating block 135 until the ledges 135A engage the lugs 118A, 119A. This is the pre-loaded assembled position of the side bearing and in this position, as is apparent in FIG. 4, the inner coil 131 is not compressed.

In the pre-loaded assembled position assumed prior to installation in the car, the side bearing is held interlocked for safety and convenience in handling and the outer coil springs 132 hold the floating block 135 up to establish a clearance of 3½ inches above the bottom wall.

Figure 4:
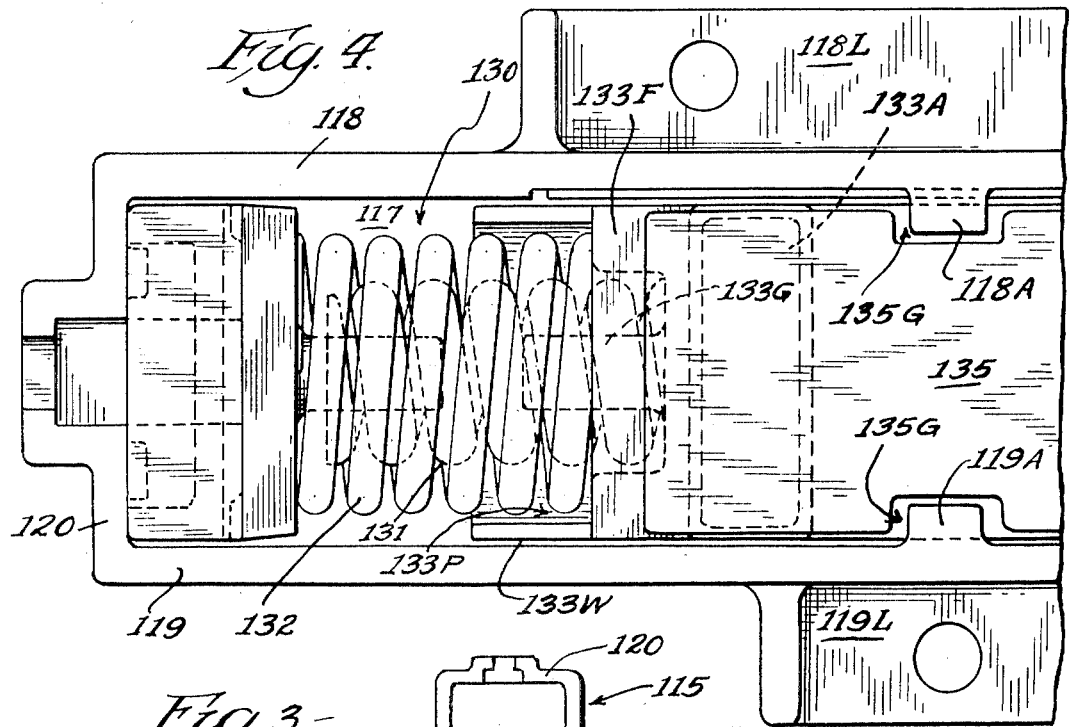
FIG. 4 is a top plan view of the side bearing unit when in its pre-loaded assembled condition prior to installation.
Figure 3:
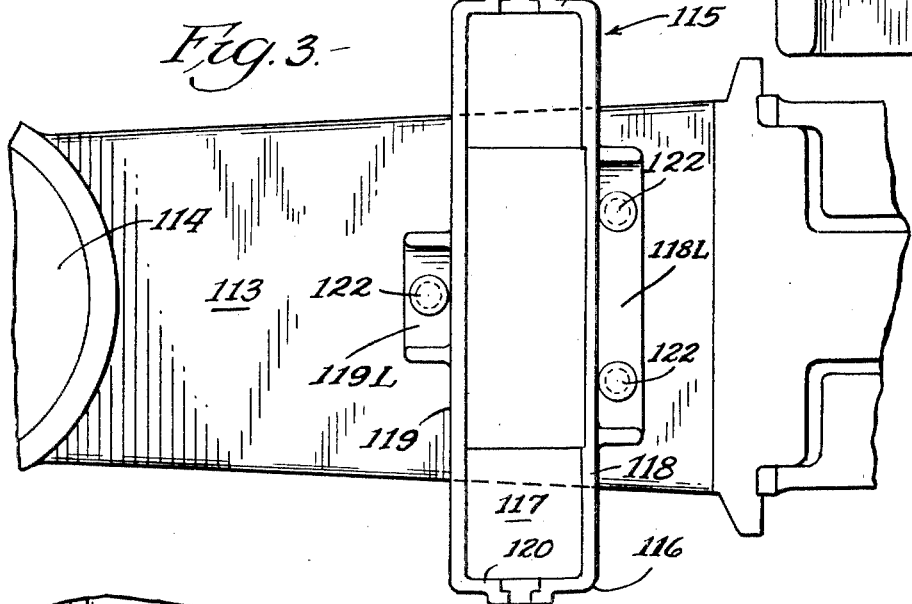
FIG. 3 is a fragmentary plan view illustrating the mounting position of the side bearing unit on the truck bolster.
Figure 2:
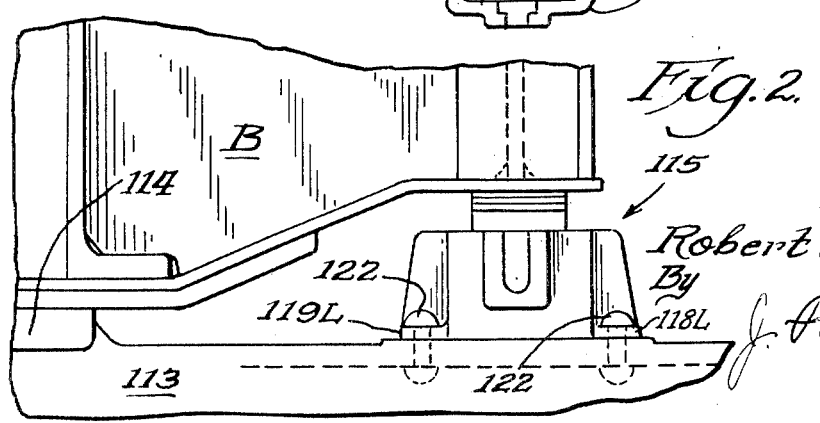
FIG. 2 is a fragmentary elevational view showing the side bearing unit of FIG. 1 in its normal pre-loaded installed position between a truck bolster and a car body bolster with shims being included to illustrate balancing of the unit during initial application.

The side bearing units of this invention are applied at the same location and are direct replacements of the standard side bearings. Where necessary, mounting holes are first drilled into the top of the truck bolster B to accommodate the fasteners 122, as best shown in FIG. 3. When both side bearings are in place on the truck bolster in supporting relation to the car body, the floating block should be depressed to the position shown in FIG. 5 wherein one inch of head clearance exists beneath the floating block. This is the normal pre-loaded installed position and each side bearing has its spring assemblies 130 precompressed to exert a substantial vertical force acting in a lifting direction upon the car and acting to hold the car truck down. An offset ledge 135L is provided along each vertical side face of the floating block 135 to present a gauge line for registry with the upper end of the housing walls 118, 119 to denote the correct normal position of the floating block when the car is at rest on level track.

Where the individual car and car truck environment result in unbalance during initial installation, one or more shims S (see FIG. 2) are inserted between the underface of the body bolster B and the top of the floating block 135 until the ledge 135L indicates that the desired one inch travel clearance has been established at the pre-loaded installed position.

The pre-loaded side bearings of this invention allow a controlled car body roll while continually absorbing and dissipating the roll energy. During roll conditions, the loaded side bearing takes up energy at the downwardly swaying side of the car body while the other side bearing keeps pressure on the unloaded truck side to prevent lifting of the wheels on the unloaded side. Thus, the side bearings allow controlled body roll but prevent wheel lift. It has been shown that the continuous downward pressure on the trucks that characterizes this stabilizing action reduces nosing of the trucks so that wheel flange wear is avoided. The stabilizing action also reduces bolster stress to minimize car wear.

In the disclosed embodiment, the floating block 135 is of No. 5 alloy steel and the aiding blocks 133 are of high tensile manganese bronze, this combination of materials being free of galling and seizing during high pressure frictional sliding engagement. In accordance with a modification shown in FIGS. 9 and 10, shoe facings 133A of a composition fibrous material including asbestos are provided to serve as the friction faces 133F of the sliding blocks, this material being selected to provide higher friction and less heat sensitivity for achieving longer wearing friction faces. Alternatively, the composition shoe facings can be provided to serve as the friction faces of the floating blocks 135 so that the sliding blocks 133 may be of a less expensive alloy material.

As shown in FIGS. 9 and 10, the shoe facings 133A are in the form of rectangular inserts loosely nested in rectangular recesses on the slide faces of the blocks. The shoe facings 133A are readily renewable without the necessity of replacing the entire slide block 133.

The support housing 116 is of any suitable cast steel and is provided with recesses in its bottom wall 117 and its outer side wall 118 each to receive a hardened steel wear plate 117W and 118W, respectively. Each wear plate may be of No. 1095 spring steel and each serves to protect the housing from high friction wear effects. The bottom wear plate 117W is 11½ inches long and is engaged by the underfaces of the sliding blocks 133 while the side wear plate 118W takes lateral thrust effects that are applied to the upper block as an incident to the swaying movement of the car body. The winged sections 133W of the slide blocks 133 extend beyond the bottom wear plate 117W to engage directly against the housing wall 117 but these winged sections, being remote from the vertical line of action of the floating block 135, are not subjected to sustained high pressure wear action.

In a typical application for 90 to 125 ton cars, the inner coil 131 has a spring rate of 77,000 pounds per inch and is a 2%6 inch O.D. diameter spring having a free height of 6½ inches and the outer coil 132 has a spring rate of 11,000 pounds per inch and is a 3⅞ inch O.D. diameter spring having a free height of 8 inches, and a solid height of 4⅜ inches. In the preloaded assembled position, only the outer coils 132 are precompressed and each exerts a horizontal force of about 1,880 pounds. In the preloaded installed position, each inner coil 131 exerts a horizontal force of about 4,900 pounds and each outer coil 132 exerts a horizontal force of about 3,300 pounds. In fully closed position, each inner coil exerts a horizontal force of about 3,850 pounds. About 40% of the horizontal spring force translates into vertical force as determined by the 62° angle of the friction faces.

In the side bearing units for 70 ton cars, the inner coil spring does not begin to be compressed until the floating block is within one inch or less of the bottom wall 117.

Another embodiment of the invention is shown in FIGS. 11 and 12 wherein the side bearing incorporates additional spring resistance to act during the final inch of closure travel of the wedge-shaped plunger 235. In FIG. 11 the parts are shown in the full pre-load position at which the 1 inch reference mark 235M is in alignment with the upper edge of the housing side walls 118. One inch of vertical closure travel remains for the plunger 235 during which each wedge shoe undergoes about ½ inch of lateral travel against the spring resistance of the associated set of inner and outer coil springs 131, 132, respectively.

Additional spring resistance is added in the form of solid rods 200 of a hard elastomer such as 70D durometer polyurethane. In the illustrated embodiment each rod 200 is 2⅛ inches long and 1⅛ inch in diameter and is disposed to float freely within the inner coil spring 131 which has an I.D. of 1%6 inches. Each rod 200 operates in a free length clearance pocket which, as measured between the spring seat stems 124G and the wedge block stems 133G, is greater than 2⅛ inches when the reference mark 235M of the center wedge is above the top of the side walls 118 and which is approximately 2⅛ inches at the exact 1 inch reference level.

The rods 200 are preferably of a polyether based urethane and each develops a spring force of 9,000 pounds when subjected to a deflection of ½ inch during the final inch of closure travel of the plunger 235. Such a urethane composition exhibits a desirable property of producing internal frictional dissipation of the load energy while the added spring force offered by each rod increases the energy dissipation of the friction clutch system defined by the center wedge 235 and the friction shoes 133.

In standard car side bearing arrangements, the forces transmitted into the truck bolster may run as much as 100,000 to 130,000 pounds immediately before closure whereas the high frictional dissipation characteristics of the present device results in a transmitted force of about 35,000 pounds when the plunger 235 is about 1/32 of an inch from closure. This reduction of the transmitted force levels permits the use of rollers between the plunger 235 and the car body to allow lower friction pivoting of the car truck as necessary when negotiating track curves. In the present side bearing, the rollers 201 are shown mounted in cavities 235C in the top face of the plunger. Normally, the system is continuously subjected to load which is transmitted through the rollers 201. The rollers are of lower Brinell hardness than the upper body member and establish essentially a line contact so as to introduce pressure concentration effects. It is important that the present side bearing be capable of reducing the transmitted force levels and thereby minimize the loading effect upon the rollers.

In the embodiment shown in FIGS. 11 and 12, the plunger 235 is provided with a pair of symetrically positioned cavities 235C opening through its upper face, each cavity having a length of 2 9/16 inches, a width of 2 5/8 inches and a depth of 1 1/4 inches. Each roller 201 is about 2 1/2 inches in length, has a diameter of 1 3/8 inches and the internal corners of the cavities are radiused at 11/16 inch to mate with the roller curvature. Each roller 201 projects about 1/8 inch above the top face of the plunger 235 to contact directly with the body bolster or insert shim which is schematically represented at 210 in FIG. 11 and permit a symmetrical application of force to the plunger.

Each roller has a total permissible travel in its cavity equal to the difference between the length of the cavity and the diameter of the roller. This provides sufficient clearance for negotiating conventional track curves of 12°.

In the embodiment of FIGS. 13 and 14, greater roller clearance is provided by the use of longer cavities 335C of shorter depth and smaller diameter rollers 301. Specifically, the cavities 335C are 3 1/2 inches long, 2 5/8 inches wide and 5/8 inch deep and the rollers 301 are 3/4 inch in diameter to project 1/8 inch above the top face of the plunger. This arrangement provides sufficient roller travel clearance to allow pivoting movement sufficient to negotiate curves as sharp as 17 1/2.

In the embodiment of FIGS. 15 and 16, a plunger 435 is provided with a central cavity 435C bounded by end recess portions 435R configured as semi-cylindrical journal bearings to receive integral axle portions 401A of a single roller 401 which nests within the cavity. The axle portions 401A are of 1 1/4 inch diameter and the main roller portion is of 3 1/2 inch diameter and is positioned to project about 1/8 inch above the top face of the plunger.

What is claimed is:

1. A side bearing assembly comprising a box-like support having a bottom wall, a pair of upstanding end walls, means to secure said support to a railway truck bolster, a pair of wedge blocks slidably mounted on said bottom wall, said wedge blocks having oppositely inclined downwardly converging surfaces, an upper plunger wedge mounted on said wedge blocks and having oppositely inclined downwardly converging underface portions slidably engaged on and mating with said inclined block surfaces, and compression spring means resiliently biasing said wedge blocks oppositely inwardly to establish a normal position for said wedge blocks and said plunger wedge wherein a central clearance space extends full length there between and wherein the force of said spring means reacts oppositely outwardly on said end walls, said plunger wedge having a recessed top wall provided with partly projecting roller means to supportingly engage the bottom surface portion of a railway car body located above the bolster and transmit vertical forces between the car and the side bearing assembly for stabilizing the car supported on said bolster and for accommodating swivel movement of said car.

2. An arrangement as recited in claim 1 in which the top wall of said plunger wedge has a pair of symmetrically disposed cavities each havng a separate roller nested therein, with rolling clearance between each said roller and end regions of each said cavity being sufficient to accommodate swivel movement of said car on 12 degree track curves.

3. An arrangement as recited in claim 1 in which the top wall of said upper block has a pair of symmetrically disposed cavities, each cavity having a flat bottom wall terminating in upwardly curving corner surfaces of predetermined radius, and a separate roller nested in each cavity with rolling clearance from the corner surfaces thereof sufficient to accommodate swivel movement of said car on 12 degree track curves, each roller having a radius substantially the same as said predetermined radius.

4. A side bearing assembly comprising a box-like support having a bottom wall and a pair of upstanding end walls, means to secure said support to a railway truck bolster, a pair of wedge blocks slidably mounted on said bottom wall, said wedge blocks having oppositely inclined transversely extending surfaces, a plunger wedge mounted on said wedge blocks and having oppositely inclined underface portions slidably engaged on and mating with said inclined block surfaces, means and separate compression spring means reacting between each end wall and corresponding wedge block to resiliently urge said wedge blocks oppositely inwardly and establish a preloaded normal position for said wedge blocks and said plunger wedge wherein a central clearance space extends full length therebetween, each compression spring means including a separate filler element of an energy dissipating, high durometer elastomer material that is substantially free of load until said plunger wedge moves downwardly of said normal position.

5. An arrangement as recited in claim 4 and wherein each compression spring means includes a double coil unit having an outer coil encircling an inner coil and establishing the initial preload force, each said filler element being a polymer of urethane and disposed within each corresponding inner coil.

6. An arrangement as recited in claim 4 wherein a separate spring seat is shiftably mounted in said support intermediately between each end wall and each wedge block, each compression spring means including a double coil unit having an outer coil encircling an inner coil and establishing the initial preload force, each spring seat and wedge blocks having a stem portion projecting into the corresponding end of the inner coil, each said filler element being disposed within the inner coil to be compressed between the stem portions projecting therein.

7. An arrangement as recited in claim 4 and wherein said plunger wedge has a recessed top wall provided with partly projecting roller means to supportingly engage the bottom surface portion of a railway car body located above the bolster and transmit vertical forces between the car and the side bearing assembly for stabilizing the car supported on said bolster and for accommodating swivel movement of said car.

8. An arrangement as recited in claim 7 in which the top wall of said upper block has a pair of symmethically disposed cavities, each cavity having a flat bottom wall terminating in upwardly curving corner surfaces of predetermined radius, and a separate roller nested in each cavity with rolling clearance from the corner surfaces thereof sufficient to accommodate swivel movement of said car on 12 degree track curves, each roller having a radius substantially the same as said predetermined radius.

9. An arrangement as recited in claim 8 and wherein each compression spring means includes a double coil unit having an outer coil encircling an inner coil and establishing the initial preload force, each said filler element being a polymer of urethane and disposed within each corresponding inner coil.

10. An arrangement as recited in claim 8 wherein a separate spring seat is shiftably mounted in said support intermediately between each end wall and each wedge block, each compression spring means including a double coil unit having an outer coil encircling an inner coil and establishing the initial preload force, each spring seat and wedge blocks having a stem portion projecting into the corresponding end of the inner coil, each said filler element being disposed within the inner coil to be compressed between the stem portions projecting therein.

References Cited
UNITED STATES PATENTS
2,541,769    2/1951    Keysor _____ 208—138

MARTIN P. SCHWADRON, Primary Examiner
S. F. SUSKO, Assistant Examiner

U.S. Cl. X.R.
308—224